United States Patent
Gurley

(10) Patent No.: US 11,232,716 B2
(45) Date of Patent: *Jan. 25, 2022

(54) PERFORMANCE COACHING APPARATUS AND METHOD

(71) Applicant: Apex Pro, LLC, Auburn, AL (US)

(72) Inventor: Austin Gurley, Auburn, AL (US)

(73) Assignee: Apex Pro, LLC, Auburn, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/035,622

(22) Filed: Sep. 28, 2020

(65) Prior Publication Data

US 2021/0027654 A1    Jan. 28, 2021

Related U.S. Application Data

(63) Continuation of application No. 15/699,253, filed on Sep. 8, 2017, now Pat. No. 10,825,354.

(60) Provisional application No. 62/385,563, filed on Sep. 9, 2016.

(51) Int. Cl.
| | |
|---|---|
| G09B 9/042 | (2006.01) |
| G09B 19/00 | (2006.01) |
| A63B 24/00 | (2006.01) |
| G06Q 10/06 | (2012.01) |

(52) U.S. Cl.
CPC ...... *G09B 19/0038* (2013.01); *A63B 24/0062* (2013.01); *A63B 24/0075* (2013.01); *G06Q 10/0639* (2013.01); *G09B 9/042* (2013.01)

(58) Field of Classification Search
CPC ........ G09B 9/042; G07C 5/085; B60W 40/09
See application file for complete search history.

(56) References Cited

U.S. PATENT DOCUMENTS

| | | |
|---|---|---|
| 6,909,947 B2 | 6/2005 | Douros et al. |
| 7,254,516 B2 | 8/2007 | Case, Jr. et al. |
| 7,565,230 B2 | 7/2009 | Gardner et al. |
| 8,552,847 B1 | 10/2013 | Hill |
| 8,585,555 B2 | 11/2013 | Tchao et al. |
| 8,941,476 B2 | 1/2015 | Hill |
| 9,170,913 B2 | 10/2015 | Hunt et al. |
| 9,177,427 B1 | 11/2015 | Briggs et al. |
| 9,251,719 B2 | 2/2016 | Ellis et al. |
| 9,280,435 B2 | 3/2016 | Hunt et al. |
| 9,327,703 B2 | 5/2016 | Hill |

(Continued)

OTHER PUBLICATIONS

International Search Report, PCT/US17/50693, "Performance Coaching Method and Apparatus" (dated Jan. 11, 2018).

(Continued)

*Primary Examiner* — Peter R Egloff
(74) *Attorney, Agent, or Firm* — Baker, Donelson, Bearman, Caldwell & Berkowitz, PC; Carl M. Davis, II

(57) ABSTRACT

An apparatus for coaching improvements for a performer during a performance activity based on observed actual performance in comparison to a possible performance, with sensors measuring performance criteria. A microprocessor computer creates respective pseudo-measurements relevant to the performance activity based on the measurements, which are normalized and evaluated as to proximity to a possible performance value. A display presents the measured actual performance in relation to the possible performance, so the performer may change actions and observe on the display the effect of the change. A method of coaching performer during a performance activity is disclosed.

18 Claims, 7 Drawing Sheets

(56) References Cited

U.S. PATENT DOCUMENTS

| | | |
|---|---|---|
| 9,384,111 B2 | 7/2016 | Hunt et al. |
| 9,412,282 B2 | 8/2016 | Hunt et al. |
| 9,424,696 B2 | 8/2016 | McQuade et al. |
| 9,747,730 B2 | 8/2017 | Baer et al. |
| 2006/0085112 A1 | 4/2006 | Lu et al. |
| 2008/0319602 A1 | 12/2008 | McClellan et al. |
| 2010/0209884 A1 | 8/2010 | Lin et al. |
| 2011/0238307 A1 | 9/2011 | Psiaki et al. |
| 2012/0083947 A1 | 4/2012 | Anderson et al. |
| 2013/0209968 A1 | 8/2013 | Miller et al. |
| 2014/0058761 A1 | 2/2014 | Freiberger et al. |
| 2014/0340211 A1 | 11/2014 | Hennessey et al. |
| 2017/0039870 A1 | 2/2017 | Ellis |

OTHER PUBLICATIONS

Written Opinion, PCT/US17/50693, "Performance Coaching Method and Apparatus" (dated Jan. 11, 2018).

PERFORMANCE COACHING APPARATUS AND METHOD

TECHNICAL FIELD

The present invention relates to apparatus and methods of measuring actual performance of a sportsman during activity relative to a determined performance capability and providing real-time guidance for improving performance to meet the determined performance while adjusting determined performance capability for further performance monitoring and improvement guidance. More particularly, the present invention relates to apparatus and methods of determining in real-time particular sports and athletic performance criteria of a sportsman and displaying a comparison of actual performance relative to determined performance capability for real-time coaching and performance improvement.

BACKGROUND OF THE INVENTION

Sports and athletic performers practice individually and under the instruction and guidance of coaches. The performers engage in practice, and receive coaching and guidance, for developing skills and abilities for sports and athletic performances and for improving such performances. There are a number of support materials and tools useful for a performer to improve performance. These materials and tools include printed documents that illustrate and describe the performance activities, imaging devices such as still image and video image cameras and recorders, and performance enhancing tools such as equipment used during performances, weights, and athletic gear. Also, persons skilled in the particular activity often work as coaches and trainers to instruct and guide the performers. Observation of performers by such experienced persons often provides a basis for a counseling instruction or guidance to the performer for improving the physical and mental skills for sports performance activities.

In the motor vehicle sports field, drivers similarly learn using such materials and tools, and further practice driving skills on road tracks and courses. More experienced drivers and instructors may accompany the driver to provide in-car instructions and explanations of the physics and forces involved in motor sports. Additionally, special equipment may be installed in the car for tracking various parameters involved in motor sports driving including engine speed (rpm), acceleration, torque, and other vehicle parameters. Such systems however are expensive and complicated to install. The data collected is difficult to interpret and further, the study of such information occurs after the driving session. Real-time feedback is limited to observations and comments by the ride-along instructor, but such is typically not robust in view of the dynamics and time limitations associated with motor vehicle racing.

Accordingly, there is a need in the art for a real-time performance monitoring and instructional guidance system that monitors sportsman actual performance and provides relative determined performance capability as real-time coaching and for performance improvement information and instruction guidance. It is to such that the present invention is directed.

SUMMARY OF THE INVENTION

The present invention meets the needs in the art by providing a driver performance apparatus for monitoring and coaching of real-time performance improvement during operation of a motor vehicle, comprising an inertia sensor mounted in a motor vehicle for measuring lateral, longitudinal, and vertical accelerations of the motor vehicle relative to three axis of direction and a speed sensor in the motor vehicle configured for measuring a velocity of the motor vehicle. A microprocessor configured for receiving periodically from the inertia sensor a respective signal representative of a momentary value of each of the measured lateral, longitudinal, and vertical accelerations of the motor vehicle and from a GPS device a momentary location of the motor vehicle for determining a momentary measured value of the velocity of the motor vehicle. A memory device configured for storing a maximum achieved value indicative of a tire grip on a road surface on which the motor vehicle is moving, a maximum achieved value of a power measurement of the motor vehicle moving on the road surface, and a maximum achieved value of a drag measurement of the motor vehicle moving on the road surface based on the respective measured signals. The microprocessor configured for determining, with the respective signals, a momentary value indicative of the tire grip, a momentary value of the power measurement, and a momentary value of the drag measurement. A display for mounting within a view of a driver of the motor vehicle, said display presenting a binary presentation for momentarily comparing a driver performance value as indicative of respective momentary values of the tire grip, the power measurement, and the drag measurement relative to the achievable driver performance based on the maximum achieved values thereof, whereby the binary presentation provides relative performance information readily understood under time constraints involved in a sports performance activity.

In another aspect, the present invention provides method for monitoring and coaching of real-time driver performance improvement during operation of a motor vehicle, comprising the steps of:

(a) equipping a motor vehicle with an inertia sensor for measuring lateral, longitudinal, and vertical accelerations of the motor vehicle relative to three axis of direction and a speed sensor for determining a velocity of the motor vehicle;

(b) periodically communicating to a memory device from the inertia sensor a respective signal representative of a momentary value of each of the measured lateral, longitudinal, and vertical accelerations of the motor vehicle and from the speed sensor a signal of a measured value of the velocity of the motor vehicle;

(c) determining, with the respective signals, a momentary value indicative of the tire grip, a momentary value of the power measurement, and a momentary value of the drag measurement;

(d) tracking a maximum achieved value indicative of a tire grip on a road surface on which the motor vehicle is moving, a maximum achieved value of a power measurement of the motor vehicle moving on the road surface, and a maximum achieved value of a drag measurement of the motor vehicle moving on the road surface based on the respective measured signals;

(e) providing a binary presentation on a display viewable by a driver for momentarily comparing a driver performance value based on the respective momentary values of the tire grip, the power measurement, and the drag measurement relative to the achievable driver performance based on the maximum achieved values thereof, whereby the binary presentation provides relative performance information readily understood under time constraints involved in a sports performance activity.

In another aspect, the present invention provides a method of coaching for guiding improvement by a performer during a performance activity, comprising the steps of:
(a) measuring periodically during the performance activity with a respective sensor at least a first performing criteria and at least a second performing criteria;
(b) generating a respective pseudo-measurement value of each of the measured first performing criteria and the measured second performing criteria;
(c) comparing said respective pseudo-measurement value to a respective maximum value associated with the performance activity,
(d) scaling the ratio of said respective pseudo-measurement value to said respective maximum value to create a fractional score for each of said pseudo-measurement values,
(e) determining which of said ratios interact geometrically, if any, and determine the proximity to the limit of the geometric sum of the measurements,
(f) comparing said ratios, including the geometric sum, to determine which of said ratios is the largest, and
(g) displaying said largest ratio on a display,
whereby the limit of performance is determined and relative actual performance is displayed to show proximity thereof to said limit for improving performance.

In yet another aspect, the present invention provides an electronic device for coaching a performer during a performance activity based on observed actual performance in comparison to a limit of performance for improved performance, comprising a first sensor generating a periodic first signal representative of a measured performance criteria and a second sensor generating a periodic second signal representative of a measured second performance criteria. A microprocessor computer is configured with instruction sets for (a) creating respective pseudo-measurements relevant to said sporting activity based on the first and second signals received from the respective sensors; (b) scaling as a ratio said current pseudo-measurement values to a maximum values to create a fractional score between zero and one for each of said pseudo-measurement, (c) determining which of said ratios interact geometrically, if any, and determining the proximity to the limit of a geometric sum of the pseudo-measurements, and (d) determining a largest of said ratios and said geometric sum. A display is configured for presenting as a binary symbol said largest ratio. The electronic device upon determining a limit of performance provides information as to a proximity of the performance to said limit for improving performance.

Objects, advantages, and features of the present invention will become apparent upon a reading of the following detailed description in conjunction with the drawings and the appended claims.

DETAILED DESCRIPTION

Figure 1:
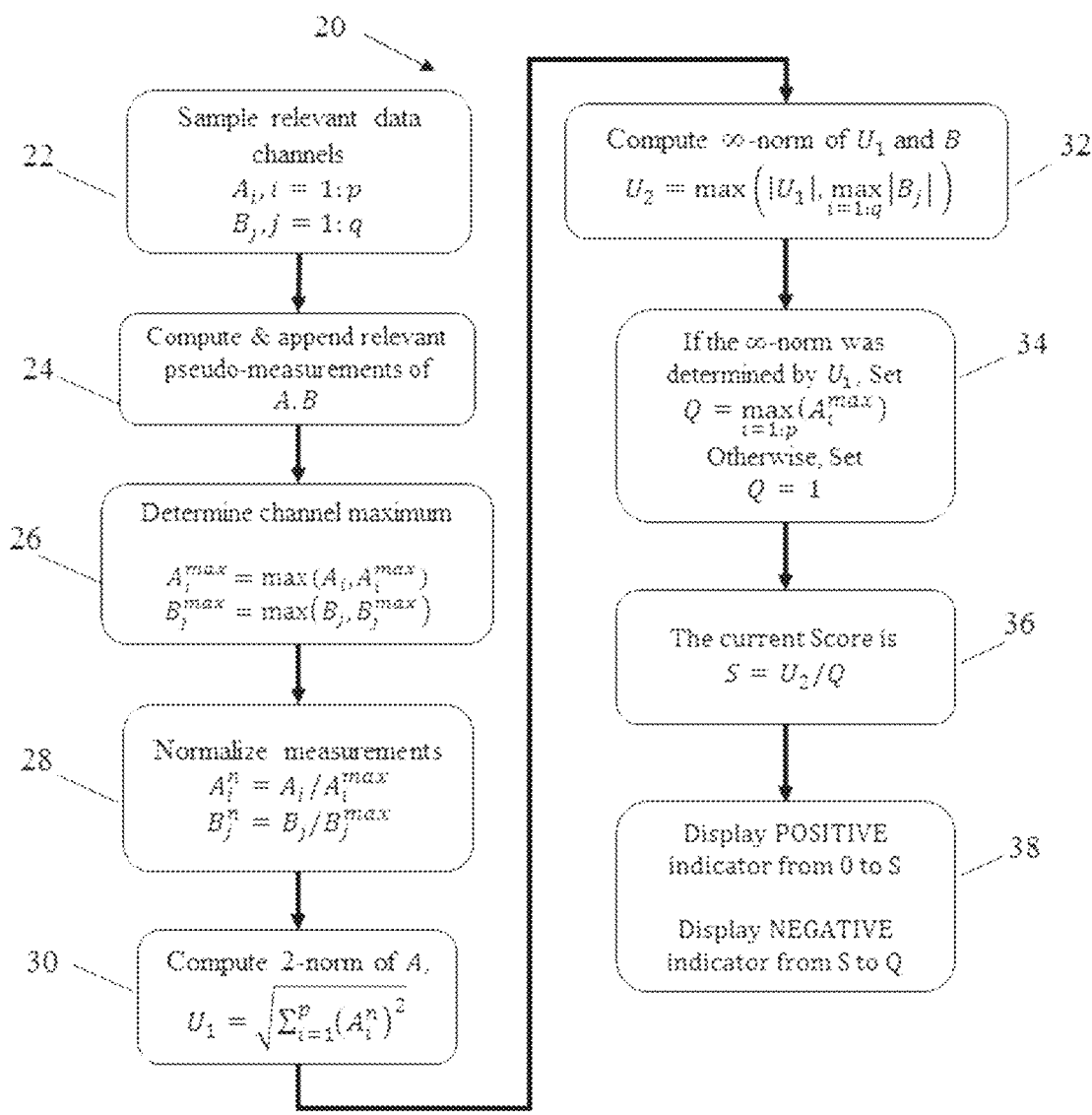
FIG. 1 illustrates a flowchart for an automated performance coaching system in accordance with the present invention.

The present invention provides meaningful insight and guidance to participants in performance activities where improvements can be developed and implanted with practice, monitoring, and feedback of actual performance in relation to possible performance. The invention provides a performance coaching device and method for automated display of performance relative to a determined level of performance. In one aspect, the invention is gainfully applied within an automotive racing field for guiding the development of race car drivers, but similarly, may be used not only for general driver training but applied as well usefully in other performance activity fields in which improvements to a sportsman or operator's performance are desirable. Accordingly, performance fields of beneficial potential for this invention include but are not limited to automotive racing, automotive driving, bicycling for competition or for health, running/jogging for competition or for health, skateboarding, watercraft operation, aircraft flight including general purpose and competition, and other performance activity fields.

In accordance with such applications, the invention is presented generally in reference to an exemplary embodiment disclosed for use within the automotive racing field. The exemplary embodiment thus is directed to coaching automotive drivers involved in motor vehicle racing but the disclosure and teachings are readily applicable to other sports or activities where actual performance may be compared with a possible performance achieved during earlier activity. The apparatus and method thus "learns" what performance is possible based on participant actions and displays an indication of current actual performance with "possible" performance. Minimizing the discrepancy or difference between actual and possible enables the performer to improve and reach the possible performance.

As discussed below, the electronic system and method of the present invention obtains inertial, GPS, and/or biometric measurements during a sporting activity and uses those measurements to instruct the sportsman/performer as to measured actual real-time performance in comparison with projected possible performance. The performer in response to the display of the performance comparison may take actions and steps to improve the performance relative to possible performance. More specifically, the apparatus and method uses inertial, GPS, and/or biometric measurements to create a model of the sporting limits of performance without need of any dimensional characteristics or other initial inputs from the user or from performance equipment, to create and display or record a simple measure of "utilized performance". The term "utilized performance" refers to the actual measured performance in relation to a projected possible performance. This is accomplished by:

1) combining inertial, navigation (such as GPS), and biometric measurements in a way to create useful metrics or 'pseudo-measurements' which constitute a dimensionless model of the performance; the system performs filtering, summing, or otherwise combining the sensor measurements into quantities relevant to the sporting activity;

2) storing the maximum limit, or a statistically determined upper limit, of those metrics that the sportsman has achieved over time; (the statistically determined upper limit is somewhat lower than an absolute maximum achieved by an individual performer);

3) computing the instantaneous level of those metrics, and comparing that instantaneous level to the maximum level that has been achieved;

4) displaying to the sportsman the dimensionless level (or percentage) of his current performance, compared to the maximum which could be achieved, on a simple gauge.

Further, the apparatus in an alternate embodiment records the dimensionless level (or percentage) of the current performance, compared to the maximum which could be achieved in an electronic database, for review after the event has ended.

Compared to other performance monitoring and reporting techniques, the apparatus and method of the present invention offers training and coaching benefits.

These benefits include

1) Performance monitoring and evaluation without initial measurements of performance or of performance equipment and connections. Known prior models require physical measurements of a vehicle or athlete (such as masses, lengths, etc.) as an initial input to begin fitting the model. Often these measurements are hard to attain for most consumers who may lack technical background in their sport and or the equipment. The present invention requires no such initial measurements.

2) Many models compute theoretical limits which are far from attainable in real situations and therefore are not useful. The method of the present invention creates models based on performance which has actually been achieved. The maximum values could be the maximum sample measured during actual performance, or could be determined statistically such as by considering the 0.99 quantile of samples as the maximum.

3) The pseudo-measurements of the present invention reveal more information about the sporting performance than direct sensor measurements that have not been modified.

4) Information presentation according to the present invention further affords benefits over systems that provide a numeric objective as a good feedback mechanism (as is used in computer controlled systems, for instance). Unlike a computer controlled systems, sportsmen often cannot pause to think about translating numerical instructions into changes in their behavior. The apparatus of the present invention provides a display of a level of percentage of performance. The display is presented in binary form (i.e., a first color for actual performance and a second contrasting color for possible performance). It is left to the sportsman, perhaps with accompanying coaching at the moment, to determine how to exert more or less effort to improve performance. For example, a driver interested in decreasing lap times' who is informed at the time of performance that he is below the limit of performance can choose either to accelerate or to steer harder into a corner. In another example, a jogger interested in health improvements, being informed by the display that he is below the limit of performance may choose to increase speed or begin to run up a hill.

5) The dimensionless feedback display may be adjusted for the performer where a numeric metric cannot. A novice sportsman may vary in his performance from 0% to 100%, while an expert may remain within a higher range, for example, 90% to 100% of peak performance. The display can be scaled to show an appropriate certain range.

With reference to the drawings, in which like parts have like identifiers, FIG. 1 illustrates a flowchart for a method 20 operative in an automated performance coaching system in accordance with the present invention, and particularly demonstrates the modelling process applicable for general sport activity. In the process, reference "A" refers to sensor measurements that interact with each other. For example, a tire cannot provide 100% of its longitudinal ability while also providing 100% of its lateral ability. The lateral and longitudinal acceleration measurements interact. Reference "B" refers to independent sensor measurements. For example, engine power is not affected by the tire grip. The apparatus and method of the present invention accommodate interlinked and independent variables for monitoring performance.

The apparatus samples 22 the relevant data channels for the particular sport. The apparatus, using the sample measurements, computes 24 relevant pseudo-measurements. The method then evaluates the sample data and determines 26 the channel maximum. The apparatus then normalizes 28 the sample measurements relative to that maximum. The apparatus then computes 30 the 2-norm value of the interacting measurements. Comparing the 2-norm value together with the independent normalized pseudo measurements, results 32 in a performance value $U_2$. Then, if $U_2$ is set by the value of $U_1$, a quotient Q is set 34 equal to the channel maximum; otherwise, Q is set equal to 1. The apparatus determines 36 a score S as the result of the performance value $U_2$ divided by the quotient Q. The apparatus displays 38 the resulting score S using an indicator normalized between 0 and the performance maximum. Initially, the performance maximum is the initial pseudo measurement by the sensor but during operation the performance maximum resets according to (PmeasureMax)=maximum of (previous PmeasureMax) and (newPmeasure) 26.

Figure 2:
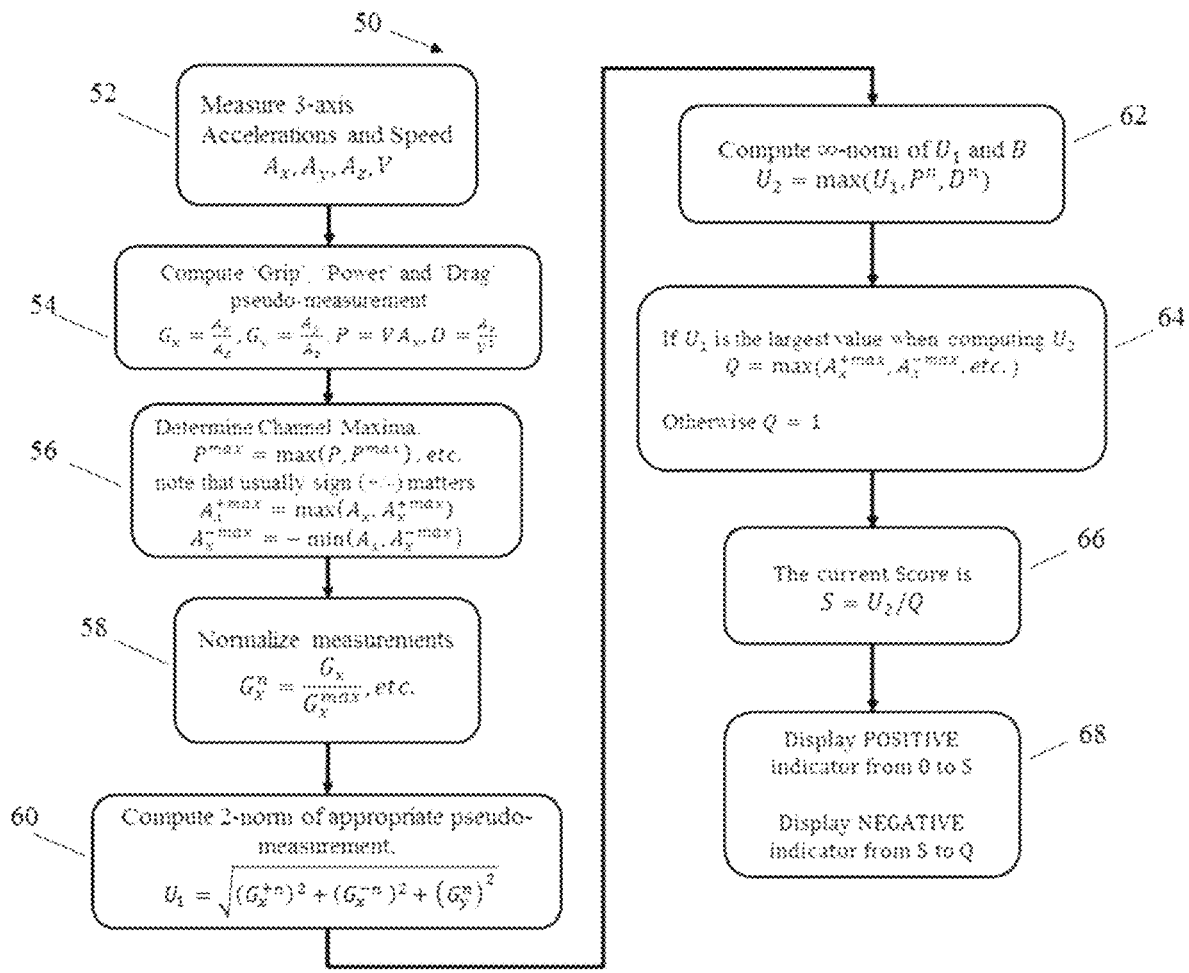
FIG. 2 illustrates a flowchart for an exemplary embodiment of an automated performance coaching system in an application for a racing driver operating a motor vehicle.

With reference to FIG. 2, the illustrative embodiment provides an electronic coaching apparatus and method 50 for automotive racing. One objective of a racing driver is to decrease lap time. In one aspect, this occurs by the driver utilizing the ability of the car to accelerate (limited by tire grip, aerodynamic drag, engine power, and other limits known to those skilled in the art), to brake (improved by aero drag, limited by tire grip, and other limits known to those skilled in the art), and to corner or accelerate laterally (limited by tire grip and other limits known to those skilled in the art).

With referenced to block 52, first, measurements are taken of acceleration in three dimensions orthogonal to the vehicle $A_x$ $A_y$ $A_z$ (from an accelerometer), and of the vehicle speed V (speed determined using a GPS devices), and other limits known to those skilled in the art. These measurements are filtered carefully to ensure the values are valid. This is done with traditional low-pass filtering (to remove noise) and with median filtering (to remove erratic measurements). Because the model is based on Maximum or Minimum values of these sensor measurements, it is important to keep filter carefully and to bound the sensor measurements within reasonable ranges. For example, a vehicle speed measurement in the illustrated embodiment is bounded at about or near 200 mph, because sensor measurements above that typically meaningless in that most automotive races do not reach such speeds.

Continuing to block 54, the vehicle will achieve maximums of speed and three axis accelerations during the driving. However, the method applies physics of a moving vehicle to create useful 'pseudo-measurements' from the sensed acceleration and speed. Tire grip is a function of the load on the tire. To account for hills and banking on the track, the lateral $A_y$ and longitudinal $A_x$ accelerations can be considered as functions of the vertical load on the vehicle as known from the vertical acceleration of the vehicle. To account for hills and banking on the track, the lateral $A_y$ and longitudinal $A_x$ accelerations are divided by the vertical acceleration to create 'grip' pseudo-measurements $G_x = A_x/A_z$, $G_y = A_y/A_z$. Further, the maximum longitudinal acceleration may be limited by the power of the vehicle and not the longitudinal grip. The metric for vehicle power is $P = V^*A_x$, which comes directly from the units of 'power' which are Newton*meters/seconds. Also, the aerodynamic drag force is expected to be proportional to velocity squared. The metric is $D = A_x/V^2$ or alternatively may be a more complex function of velocity as known to those skilled in the art. Other such limits are known to those skilled in the art, and may be included with sensor measurements in alternate embodiments. The pseudo-measurements are all more useful than direct measurements. For example, knowledge of the maximum speed provides no information about the abilities of the car to accelerate at any other speed, but creating the pseudo-measurements P and D provide information or knowledge of effects that are relevant at all speeds.

In an alternate embodiment, the maximum level is determined statistically. For example, the method defines the limit as the 98$^{th}$ percentile of the sample, rather than the absolute maximum that has been attained and measured. This makes the process robust to flaws in sensor measurements. It also allows more complex pseudo-measurement limits to be fit accurately, such as the power pseudo-measurement $P = V^*A_x$ which should be ensured to fit the limits across a wide range of velocities.

With reference to block 56, the measurements and pseudo-measurements are checked while driving to determine whether the current sensed measurement is the largest/smallest value that has been attained during the session (or by the car at any point). If the current value is the highest/lowest ever, it is recorded and stored as part of the model.

Further, the maximum levels can be allowed to decay over time, or to reset occasionally. This ensures that the model is always based on data that is current and relevant. For instance, daily temperature variations, normal tire wear, and other slow changes known to those skilled in the art would be reasons to allow a slow decay of model limits. Changes in weather like sudden rainfall, extreme events like driving off course, determination and resolution of sensor measurement errors, and other fast changes known to those skilled in the art would be reasons to allow a reset of model parameters. In the illustrated embodiment, Pseudo measure maximum=maximum of previous pseudo measure maximum, and the new pseudo measurement value.

However, in an exemplary embodiment that employs a decay feature, at 50 Hz, the pseudo measurement maximum adjusts by a decay value. The decay feature modifies the reset of the pseudo measurement maximum to:

Pseudo measure maximum=maximum of previous pseudo measure maximum scaled by a constant alpha, and the new pseudo measurement value, where the scaling constant alpha is a number close to, but smaller than, 1.0, for example, alpha=0.99999. Over time, the decay alpha tends to reduce pseudo measure maximum if the new pseudo measurement value as determined periodically is less than the pseudo measure maximum.

Accordingly, the alternate embodiment monitors the difference between the computed pseudo measurement during performance and pseudo measurement maximum, and if the difference does not substantially decrease over time (i.e., the performer does not achieve actual performance closer to possible performance), the pseudo measurement maximum adjusts to bring the projected possible performance closer to actual performance of the performer.

The method then normalizes 58 the instantaneous measurements and pseudo-measurements with the maximum that has been achieved. Normalizing bounds the measurements and pseudo-measurements between 0 and 1, and making them unitless, allows the measurements to be compared relative to each other. For example, comparing acceleration (range from −2 G's to 2 G's) with speed (range from 0 mph to 200 mph) is not meaningful. Normalizing helps comparison of different performance factors that are being measured.

As explained in block 60, some measurements interact with each other. For example, a tire cannot provide 100% of its longitudinal ability while also providing 100% of its lateral ability. The metrics that interact in such a way are bounded within a circle, sphere, or hypersphere with radius 1. The math term for this distance is the '2-norm' value. The first 'magic number' is the radius within the sphere—$U_1$.

Further, as explained in block 62, some measurements do not interact with each other. For example, engine power is not affected by the tire grip. These measurements however are included in performance determination, and combine within a square, cube, or hypercube with sides of half-length 1. The second magic number $U_2$ is reflective of the maximum of the measurements which do not interact. It is noted that that the value of $U_1$ is also one of the non-interacting measurements and is included in determining $U_2$.

Block 64 relates to improved feedback display. When the limit of performance is bounded by $U_1$ and not $U_2$, then it is useful to display to the sportsman a different scale that does not range from 0 to 100%, but ranges instead from 0 to the current limiting bound. For instance, a vehicle may brake at 2 Gs but only accelerate at 1 G. If the limit of $U_1$ is forward acceleration, then the vehicle has a maximum of 1 G, but because braking ranges from 0 G's to 2 G's, the apparatus displays the performance on a scale from 0 to 50%, not 0 to 100%. The illustrated embodiment uses a red 'target' LED bar and a green 'current performance' bar, as helpful display of information.

Block 66 computes a current performance score.

The display updates 68, and the process then repeats. In the illustrated embodiment, the process repeats between about 50 to about 200 times per second. The rate may depend on the measurement sensors and hardware used.

Figure 3:
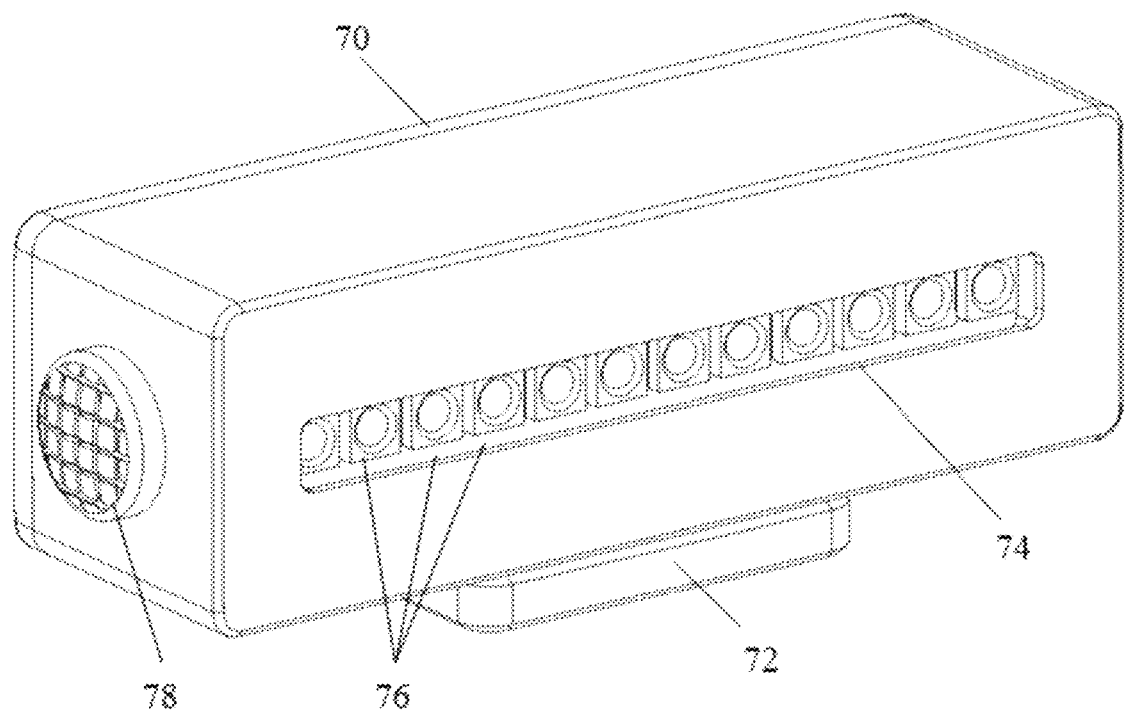
FIG. 3 illustrates a housing for an embodiment of the automated performance coaching system that mounts in a motor vehicle for sensing vehicle operation and displaying real-time feedback of measured actual performance in comparison with possible performance.

FIG. 3 illustrates a housing 70 for an embodiment of the automated performance coaching system according to the present invention. The housing 70 includes a mounting baseplate 72 for mounting in a motor vehicle for sensing vehicle operation and displaying real-time feedback of measured actual performance in comparison with possible performance. A face of the housing presents a display 74. In the illustrated embodiment, the display 74 has a plurality of separate LEDs 76. The illustrated embodiment uses a field of 12 LEDs 76. The LEDs 76 are selectively illuminated to display a visual indication of performance. A first color indicates actual performance and a second color indicates possible performance for a binary presentation readily understood under time constraints involved in sports performance activities. A power button 78 connects to a battery and to the electronic circuit within the housing 70. The apparatus is independent of motor vehicle data systems and vehicle sensors.

Figure 4:
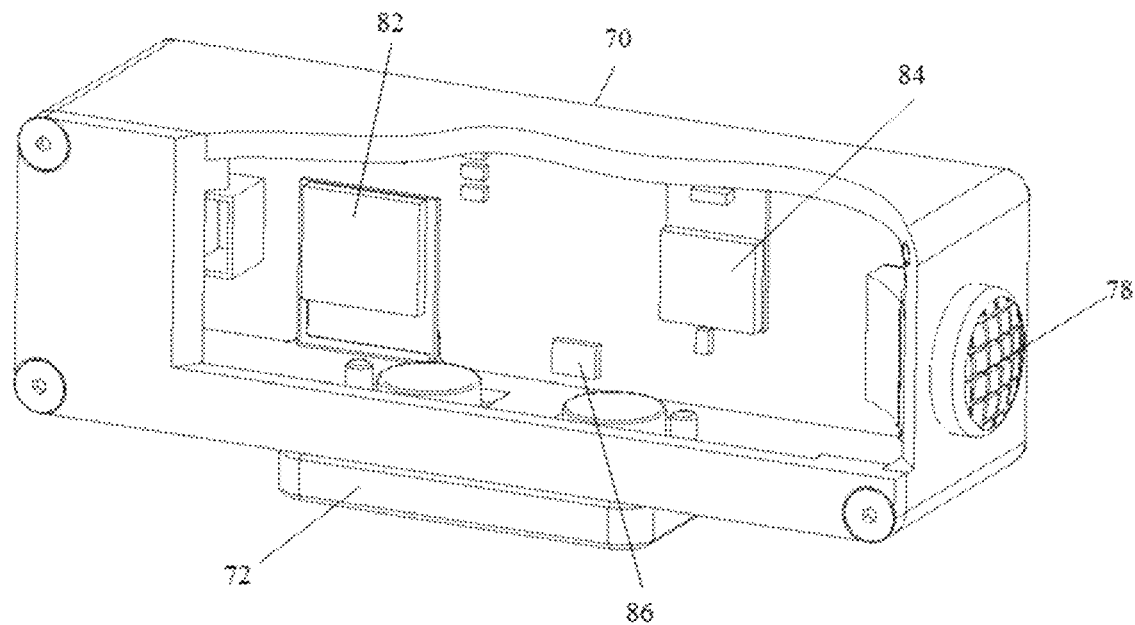
FIG. 4 illustrates the housing shown in FIG. 3 in cut-away view to illustrate components of the automated performance coaching system.
Figure 5A:
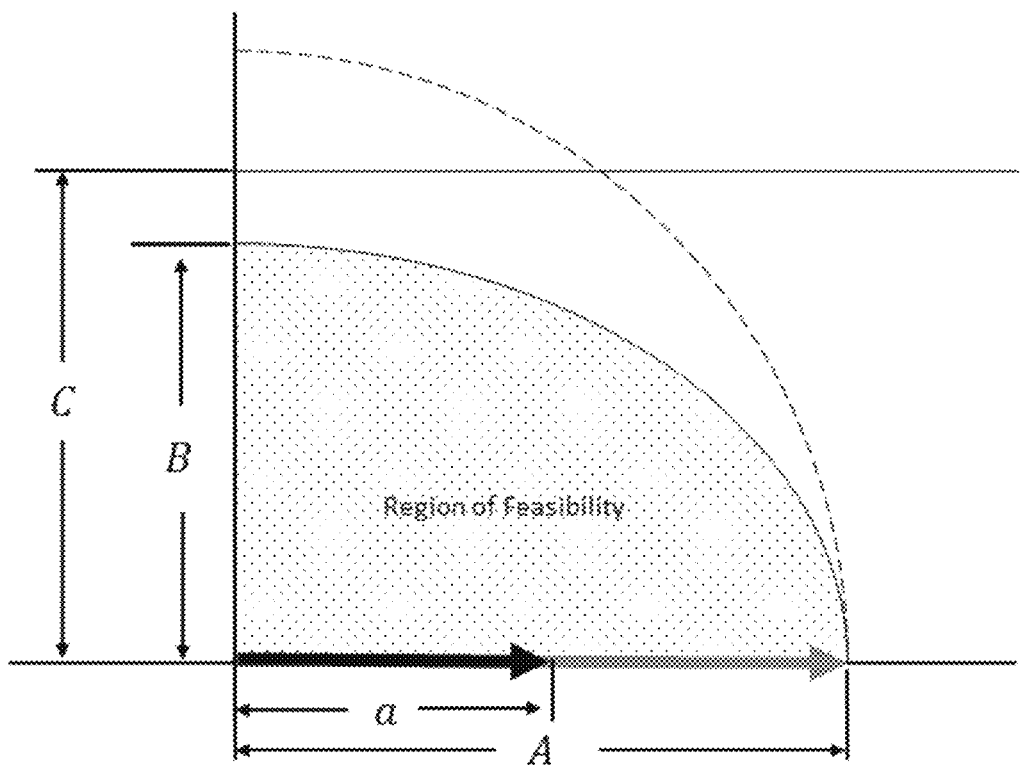
FIGS. 5A, 5B, 6A, 6B, and 7A, 7B illustrate a graph of the pseudo measurements and the feedback display provided by the performance coaching apparatus and method under illustrative vehicle operating scenarios.
Figure 5B:
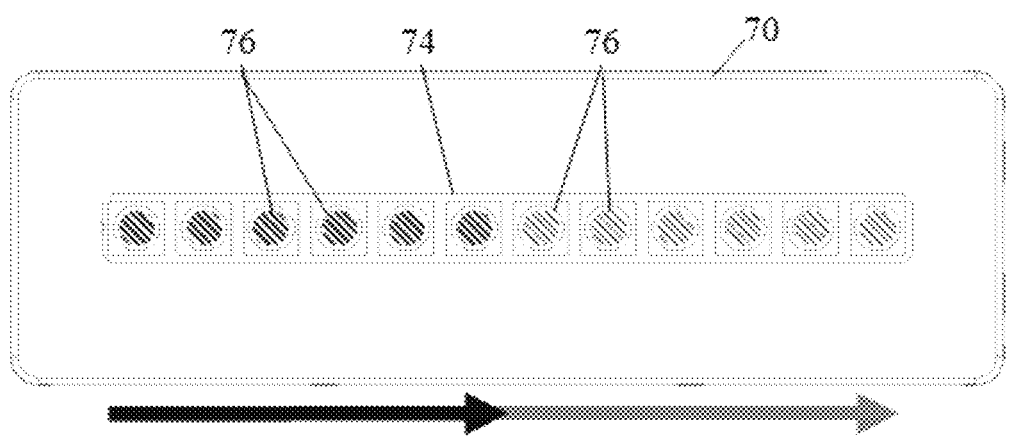

FIG. 4 illustrates the housing 70 in cut-away view to illustrate the components of the automated performance coaching apparatus. The apparatus includes a microprocessor device 82 mounted on a circuit board and configured to receive signals from a GPS (global positioning system) device 84 and an inertia measurement unit (IMU) 86 (for measuring acceleration in three dimensions) that are enclosed in the housing 70. The microprocessor 82 drives the display 74 to provide a visual indication of driver performance relative to a determined performance level computed from the input signals. In the illustrated embodiment, the display 74 is an array of 12 LEDs 76. Respective ones of the LEDs illuminate to indicate a level of determined performance. No external connections are made to sensors on the motor vehicle and no inputs from the vehicle data buss. The housing 70 mounts in the car facing forward. The apparatus operates upon switching the power button 78. A communications port may be included for downloading of collected sensor measurements for subsequent study and analysis. In an alternate embodiment, the communications port accepts initialization data for the performance max values. The initialization data may provide limits that are known more accurate or quickly than by starting without such initial information. An alternate embodiment includes a wireless interface communications devices, such as but not limited to Bluetooth interface, for collecting driver and motor vehicle operational and performance measurements and holding such data in a database for after-sessions analysis.

With reference to FIGS. 2 and 4 as to the illustrative embodiment, the microprocessor 82 receives signals indicating the instantaneous acceleration in three dimensions of the motor vehicle as detected from an accelerometer in the IMU 86. The GPS device 84 provides a signal of the vehicle speed.

The microprocessor 82 then computes the "pseudo measurements" of performance from the acceleration and speed, including tire grip, vehicle power, aerodynamic drag force and other selected measurements relevant to performance. During driving of the motor vehicle, the microprocessor 82 checks, and updates the largest and smallest values as appropriate associated with each of the measurements and pseudo measurements.

The instantaneous measurements and pseudo measurements are compared to the minimum/maximum associated with the respective measurement and normalized (that is, the maximum is set equal to 1); the comparison of actual performance and maximum is then a percentage of possible or maximum performance.

The measurements that interact with each other are used to define a first factor. The first factor is the "2-norm" radius within a sphere having a radius of 1.

Other measurements that do not interact (including the value of the first factor) are used to define a second factor. If the first factor is greater than the second factor, a quotient value is set equal to the first factor; otherwise the quotient value is set to 1. A score is then determined by the ratio of the second factor and the quotient value. The display 74 presents the score graphically. The display 74 presents a positive indicator in the range from 0 to the score and a negative indicator from the score to the quotient value. Appropriate ones of the LEDs illuminate to display the performance information. The smaller the discrepancy between the score and the quotient value, the closer the driver is to meeting expected performance.

The driver then determines how to exert more or less effort to improve performance (that is, to adjust the driving in order to minimize the discrepancy of the displayed performance). The microprocessor is configured for repeatedly computing the score and displaying the score for helping the driver adjust his performance, for example, between about 50 and 200 times per second.

The present invention provides:
housing for IMU and GPS devices that detect acceleration and speed (but not electronically connected to data buss of a motor vehicle);
developing pseudo-measurements based on signals from IMU and GPS;
tracking and re-setting minimums/maximums (as appropriate) of the measurements and pseudo-measurements as possible performance that can be attained;
comparing actual performance shown by detected current measurements and pseudo-measurements with possible performance; and
displaying an analog, preferably binary, representation of actual and possible so that modifying performance to minimize difference leads to improved performance.

The invention learns as the driver improves performance because the relevant minimums and maximums of performance are re-set and thereby change the possible performance that may be obtained.

FIGS. 5A, 5B, 6A, 6B, and 7A, 7B illustrate a graph of the pseudo measurements and the feedback display provided by the performance coaching apparatus and method under illustrative vehicle operating scenarios. In the operating scenario depicted in FIGS. 5A and 5B, the current pseudo measurements are "a", "b" equal to 0, and "c" equal to 0. The limits (maximum performance) are "A", "B" and "C", respectively. Because "b" and "c" are zero, the performance is limited by "A". In this illustration, the driver is performing at 50%, so the display 74 illuminates 6 of the 12 LEDS 76. Also, "A" is the largest of the acceleration limits, and the display ranges from 0% to 100%. The limit "C" has no influence on the display of information.

Figure 6A:
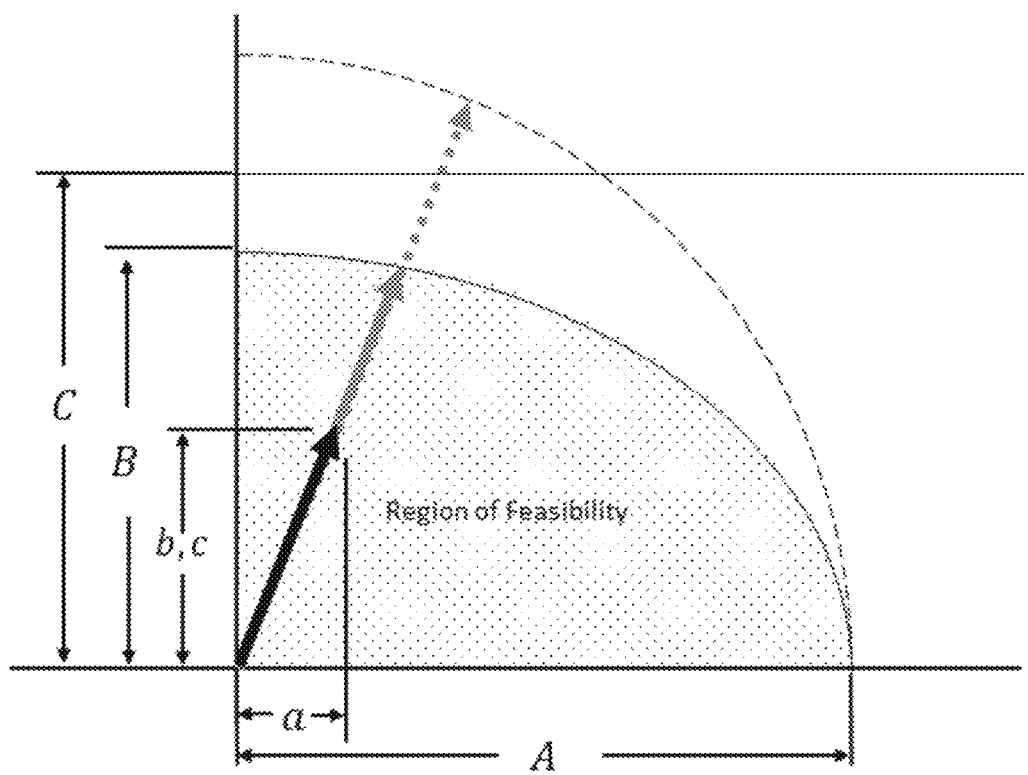
Figure 6B:
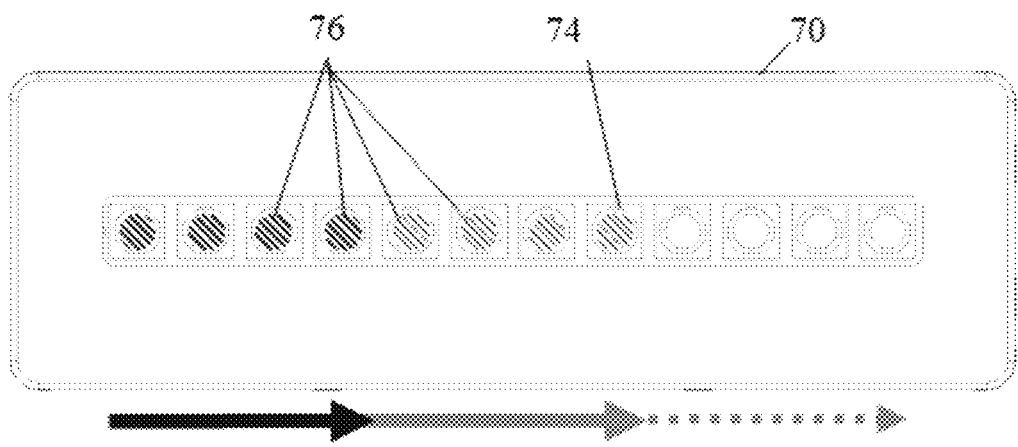

In the operating scenario depicted in FIGS. 6A and 6B, the current pseudo measurements are "a", "b" and "c". The limits (maximum performance) are "A", "B" and "C", respectively. Performance is limited by a geometric combination of "A" and "B". The driver is at 50% of the limit, so the display 74 illuminates as 50% positive. "A" is the largest of the acceleration limits, so the display 74 is scaled down to about 67% of the complete display capacity. Four LEDS 76 illuminate in a first color; the subsequent four LEDS illuminate in a second color different and contrasting with first color. The display accordingly provides performance information in a readily understood binary format. The limit "C" has no influence on the display of information. As the driver adjusts the operation of the motor vehicle, more or less of the LEDs are depicted in the respective first or second color, as the driver seeks to approach the maximum performance (indicated by the final of the four LEDs in the second color).

Figure 7A:
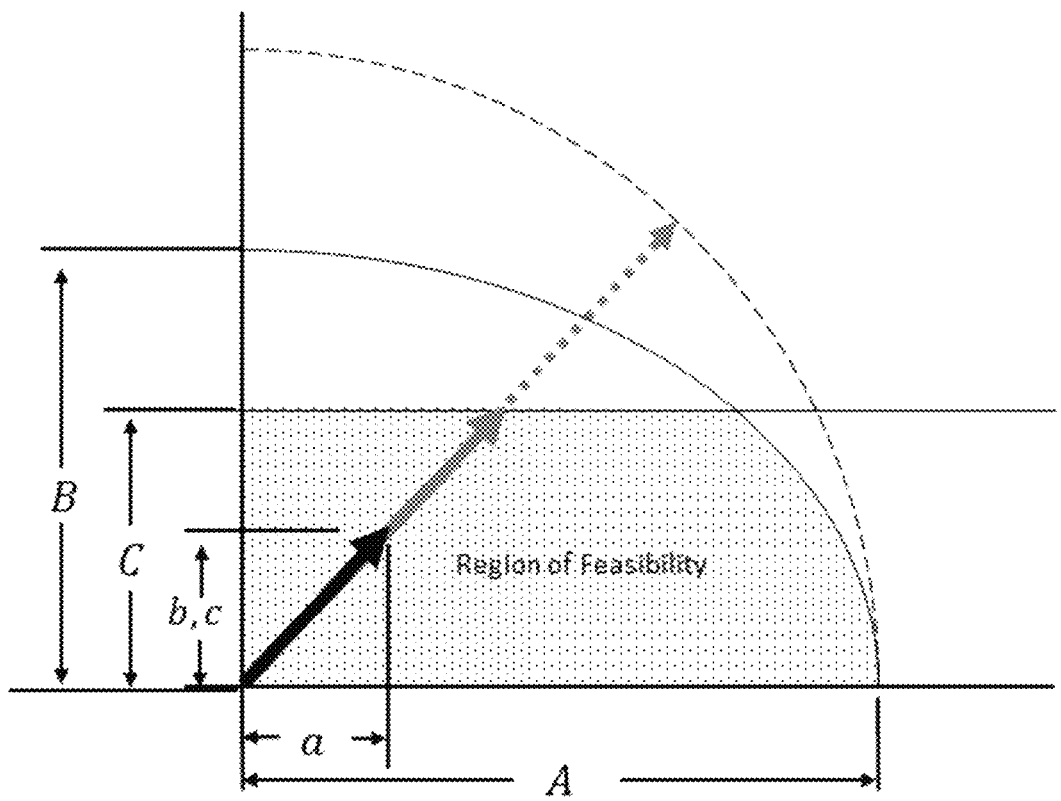
Figure 7B:
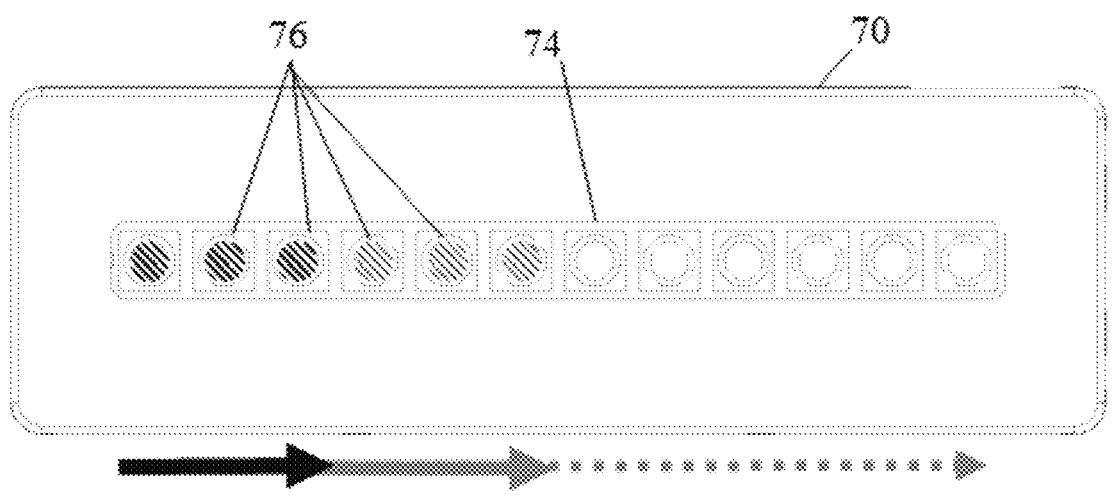

In the operating scenario depicted in FIGS. 7A and 7B, the current pseudo measurements are "a", "b" and "c". The limits (maximum performance) are "A", "B" and "C", respectively. Performance is limited by "C", which is independent of "A" and "B". The driver is at 50% of the limit, so the display 74 illuminates as 50% positive. "A" is the largest of the acceleration limits, so the display 74 is scaled down to 50% of the complete display capacity. Three LEDS 76 illuminate in a first color; the subsequent three LEDS illuminate in a second color different and contrasting with first color. As the driver adjusts the operation of the motor vehicle, more or less of the LEDs are depicted in the respective first or second color, as the driver seeks to approach the maximum performance (indicated by the final of the three LEDs in the second color).

Figure 8:
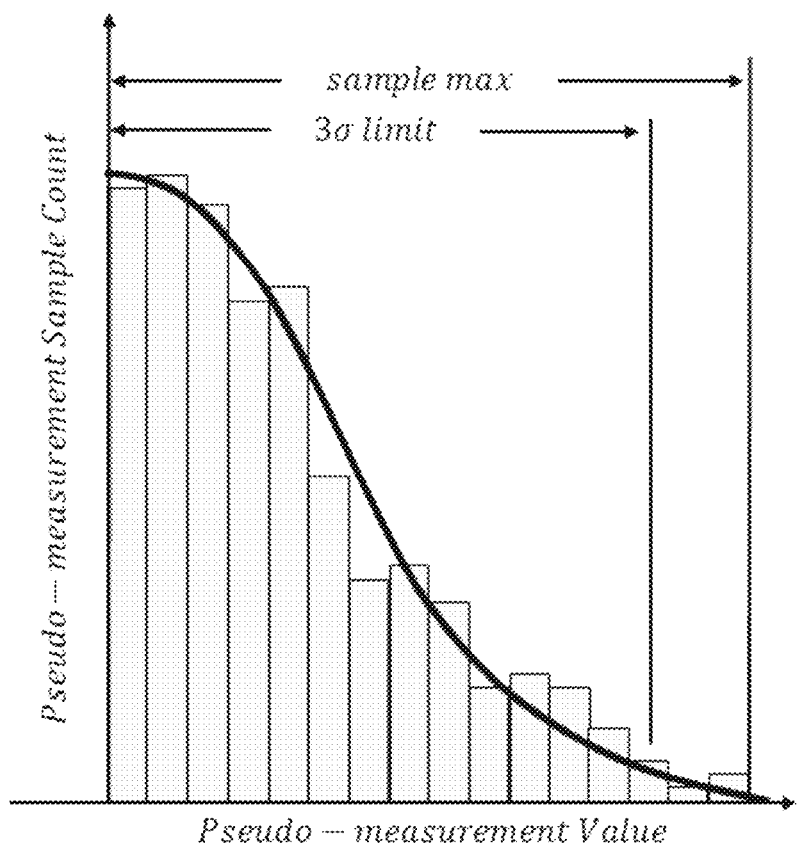
FIG. 8 illustrates a graph of the maximum pseudo-measurement according to the present invention.

FIG. 8 illustrates an explanatory graph of the maximum pseudo-measurement according to the present invention. The value stored as a reference or "maximum pseudo measurement" may be either (a) the absolute maximum value measured (the "sample max" shown in the graph) or (b) a statistical maximum, as may be determined by a standard deviation and range of measured values, or alternatively, based on an analysis of typical driver performance such as measurement records of other drivers operating motor vehicles at a particular road track or course involved.

Summary Elements
- Sensor measurements—inertial, navigational, biometric, or atmospheric sensor samples
- Pseudo-measurements (PM)—algebraic ratios and sums of filtered sensor measurements
- PM maximum values (and maximum functions)—the maximum value (or a function for the maximum value) which each PM has attained (or is known to have attained)
- Normalized Pseudo-measurements (NPM)—ratio of PMs to their respective maximums
- Interacting NPM—NPMs which interact geometrically
- Independent NPM—NPMs which do not interact, including the Interacting NPMs
- Maximum Independent NPM—Maximum of all Independent NPMs
- Display and/or Record of the Maximum Independent NPM In the following example applications of use of the present invention, the measurement criteria (A) and (B) are interacting limits and (C) is an independent limit.

Race Car Application
- (A) lateral acceleration (Ay)
- (B) longitudinal acceleration (Ax)
- (C) (Ps) specific power the limit of which is found as the maximum of speed times Ax Running
- (A) speed (horizontal distance per time unit)
- (B) vertical speed (elevation change per time unit)
- (C) Heart rate (wherein the sensor is a biometric monitoring sensor)

Cycling
- (A) forward acceleration (Ax)
- (B) speed (V)
- (C-1) (Ps) specific power the limit of which is found as the maximum of speed times Ax
- (C-2) specific aerodynamic drag (Ds), the limit of which is found based on the top speed (Vmax) and (Ps) as Ds=2*(Ps)/((Vmax)3)

Quadcopter (Drone) Devices

Quadcopter devices typically use four or more spaced-apart motor-operated rotors for powered flight of the device. In this embodiment,
- (A) vertical acceleration
- (B) roll and pitch rates
- (C) the maximum rotor rate.

It is to be appreciated that the present invention may be gainfully applied in electronic game environments that simulate the particular performance activity. For example, in a racecar video game, the driving coach apparatus makes measurements based on the displayed determined action of the motor vehicle as operated by the game player (i.e., operated for acceleration, deceleration and steering) which motor vehicle operational criteria are relied upon in determining and displaying the movement and position of the motor vehicle on the game screen during play. A display window viewable on the display of the game presents the multiple lights indicating actual performance compared with possible performance. Similarly, a biking simulation offered in association with a stationary bike for race routes or exercise routes that have vertical direction elevation changes and horizontal direction courses (curved and straightway) monitors performer speed and drag data and displays actual performance relative to possible performance.

Although particular embodiments of the invention have been illustrated and described, various changes may be made in the form, composition, construction, and arrangement of the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention.

What is claimed is:

1. A driver performance apparatus for monitoring and coaching of real-time performance improvement during operation of a motor vehicle, comprising:
   an inertia sensor mounted in a motor vehicle for measuring lateral, longitudinal, and vertical accelerations of the motor vehicle relative to three axis of direction;
   a speed sensor in the motor vehicle configured for measuring a velocity of the motor vehicle;
   a microprocessor configured for receiving periodically from the inertia sensor a respective signal representative of a momentary value of each of the measured lateral, longitudinal, and vertical accelerations of the motor vehicle and from a GPS device a momentary location of the motor vehicle for determining a momentary measured value of the velocity of the motor vehicle;
   a memory device configured for storing a maximum achieved value indicative of a tire grip on a road surface on which the motor vehicle is moving, a maximum achieved value of a power measurement of the motor vehicle moving on the road surface, and a maximum achieved value of a drag measurement of the motor vehicle moving on the road surface based on the respective measured signals;
   the microprocessor configured for determining, with the respective signals, a momentary value indicative of the tire grip, a momentary value of the power measurement, and a momentary value of the drag measurement; and
   a display for mounting within a view of a driver of the motor vehicle, said display presenting a binary presentation for momentarily comparing a driver performance value as indicative of respective momentary values of the tire grip, the power measurement, and the drag measurement relative to the achievable driver performance based on the maximum achieved values thereof, whereby the binary presentation provides relative performance information readily understood under time constraints involved in a sports performance activity.

2. The driver performance apparatus as recited in claim 1, wherein the microprocessor determines the driver performance value based on the momentary value indicative of the tire grip, the momentary value of the power measurement, and the momentary value of the drag measurement.

3. The driver performance apparatus as recited in claim 2, wherein the driver performance value comprises a normalized value of a respective lateral and longitudinal measurement indicative of the tire grip on the road surface based on a determination of a momentary acceleration of the motor vehicle, a power measurement based on the measured momentary velocity relative to the momentary measured longitudinal acceleration, and a drag measurement based on the momentary measured longitudinal acceleration and velocity.

4. The driver performance apparatus as recited in claim 3, wherein the microprocessor is configured for setting a respective maximum measurement relative to a respective prior maximum and the computed respective momentary value.

5. The driver performance apparatus as recited in claim 4, wherein the microprocessor is further configured to determine the driver performance value based on a 2-norm value of respective interacting normalized measurements of the tire grip, power measurement, and velocity.

6. The driver performance apparatus as recited in claim 5, wherein the driver performance value is based on a 2-norm value of the measurements of the tire grip, power measurement, and velocity.

7. The driver performance apparatus as recited in claim 1, further comprising a housing enclosing the microprocessor and memory device for mounting in a motor vehicle.

8. The driver performance apparatus as recited in claim 1, wherein the binary display comprises a first portion indicative of a driver performance value based on a ratio of the momentary value to the maximum measured values and a second portion indicative of an achievable driver performance based on the maximum measured values relative to the measured momentary signals.

9. The driver performance apparatus as recited in claim 8, wherein the binary display comprises a plurality of spaced-apart indicator lamps and said first portion for illuminating in a first color and said second portion for illuminating in a second color.

10. The driver performance apparatus as recited in claim 1, wherein the speed sensor comprises a GPS device in the motor vehicle configured for determining a momentary location of the motor vehicle for measuring a velocity of the motor vehicle.

11. A method for monitoring and coaching of real-time driver performance improvement during operation of a motor vehicle, comprising the steps of:
(a) equipping a motor vehicle with an inertia sensor for measuring lateral, longitudinal, and vertical accelerations of the motor vehicle relative to three axis of direction and a speed sensor for determining a velocity of the motor vehicle;
(b) periodically communicating to a memory device from the inertia sensor a respective signal representative of a momentary value of each of the measured lateral, longitudinal, and vertical accelerations of the motor vehicle and from the speed sensor a signal of a measured value of the velocity of the motor vehicle;
(c) determining, with the respective signals, a momentary value indicative of the tire grip, a momentary value of the power measurement, and a momentary value of the drag measurement;
(d) tracking a maximum achieved value indicative of a tire grip on a road surface on which the motor vehicle is moving, a maximum achieved value of a power measurement of the motor vehicle moving on the road surface, and a maximum achieved value of a drag measurement of the motor vehicle moving on the road surface based on the respective measured signals;
(e) providing a binary presentation on a display viewable by a driver for momentarily comparing a driver performance value based on the respective momentary values of the tire grip, the power measurement, and the drag measurement relative to the achievable driver performance based on the maximum achieved values thereof,
whereby the binary presentation provides relative performance information readily understood under time constraints involved in a sports performance activity.

12. The method as recited in claim 11, further comprising the step of determining the driver performance value based on a normalized value of a respective lateral and longitudinal measurement indicative of the tire grip on the road surface based on a determination of a momentary acceleration of the motor vehicle, a power measurement based on the measured momentary velocity relative to the momentary measured longitudinal acceleration, and a drag measurement based on the momentary measured longitudinal acceleration and velocity.

13. The method as recited in claim 12, further comprising the step of setting a respective maximum measurement relative to a respective prior maximum and the computed respective momentary value.

14. The method as recited in claim 13, further comprising the step of determining the driver performance value based on a 2-norm value of respective interacting normalized measurements of the tire grip, power measurement, and velocity.

15. The method as recited in claim 13, further comprising the step of determining the driver performance value based on a 2-norm value of the measurements of the tire grip, power measurement, and velocity.

16. The method as recited in claim 11, wherein the displaying step displays a first portion indicative of the driver performance value based on a ratio of the momentary value to the maximum measured values and a second portion indicative of an achievable driver performance based on the maximum measured values relative to the measured momentary signals.

17. The method as recited in claim 16, wherein the binary display comprises a plurality of spaced-apart indicator lamps and said first portion for illuminating in a first color and said second portion for illuminating in a second color.

18. The method as recited in claim 11, wherein the speed sensor comprises a GPS device and further comprising the step of determining a momentary location of the motor vehicle for determining the velocity of the motor vehicle.

* * * * *